(12) United States Patent
Deleeuw

(10) Patent No.: US 6,753,879 B1
(45) Date of Patent: Jun. 22, 2004

(54) CREATING OVERLAPPING REAL AND VIRTUAL IMAGES

(75) Inventor: William C. Deleeuw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 09/609,724

(22) Filed: Jul. 3, 2000

(51) Int. Cl.[7] .............................................. G09G 5/00
(52) U.S. Cl. .................. 345/629; 345/632; 345/633; 345/863; 348/787; 348/789; 348/836; 353/50; 606/32
(58) Field of Search ................................ 345/751–783, 345/502–522, 629, 863, 473, 633, 632; 353/50; 463/50; 348/601, 598, 836, 787, 789; 604/95.01; 606/32

(56) References Cited

U.S. PATENT DOCUMENTS

| 5,083,558 A | * | 1/1992 | Thomas et al. | 128/202.12 |
| 5,588,139 A | * | 12/1996 | Lanier et al. | 703/1 |
| 5,616,078 A | * | 4/1997 | Oh | 463/8 |
| 5,795,227 A | * | 8/1998 | Raviv et al. | 463/34 |
| 5,856,811 A | * | 1/1999 | Shih et al. | 345/8 |
| 6,195,104 B1 | * | 2/2001 | Lyons | 345/473 |
| 6,434,255 B1 | * | 8/2002 | Harakawa | 382/103 |

FOREIGN PATENT DOCUMENTS

WO    WO 00/38117    *    6/2000    ........... G06T/17/40

OTHER PUBLICATIONS

PCT Publication #: PCT/US99/30753, International Publication #: WO 00/38117, International Publication Date: Jun. 29, 2000, Jayaram, et al., Virtual Assembly Design Environment (VADE).*

* cited by examiner

Primary Examiner—Matthew C. Bella
Assistant Examiner—Antonio Caschera
(74) Attorney, Agent, or Firm—Trop, Pruner & Hu, P.C.

(57) ABSTRACT

A computer generated image may be displayed inside an enclosure. The enclosure may include a transreflective surface so that the user can view the image generated by the computer system overlaid with a body part of the user. The computer generated images may move relative to the known position of the body part. As a result, the illusion is created that the physical body part interacts in a meaningful way with the computer generated image.

19 Claims, 6 Drawing Sheets

CREATING OVERLAPPING REAL AND VIRTUAL IMAGES

BACKGROUND

This invention relates generally to processor-based systems and particularly to processor-based systems to create virtual reality displays.

Virtual reality devices enable a user to interact with images generated by a computer system. From the user's point of view, the images may appear to be real objects. By receiving feedback about the user's movements, the computer generated images may be modified so that those images appear to interact with the human user.

For example, head mounted displays may be utilized to produce the illusion of an interaction with a virtual reality image. In addition, data generating gloves may be worn by the user to generate position signals indicative of the user's position. In some cases, relatively expensive equipment and burdensome procedures may be necessary to assume a virtual reality experience.

Thus, there is a continuing need for better ways to make a virtual reality experience available at a relatively lower cost, for example in connection with toys and other entertainment devices.

DETAILED DESCRIPTION

Figure 1:
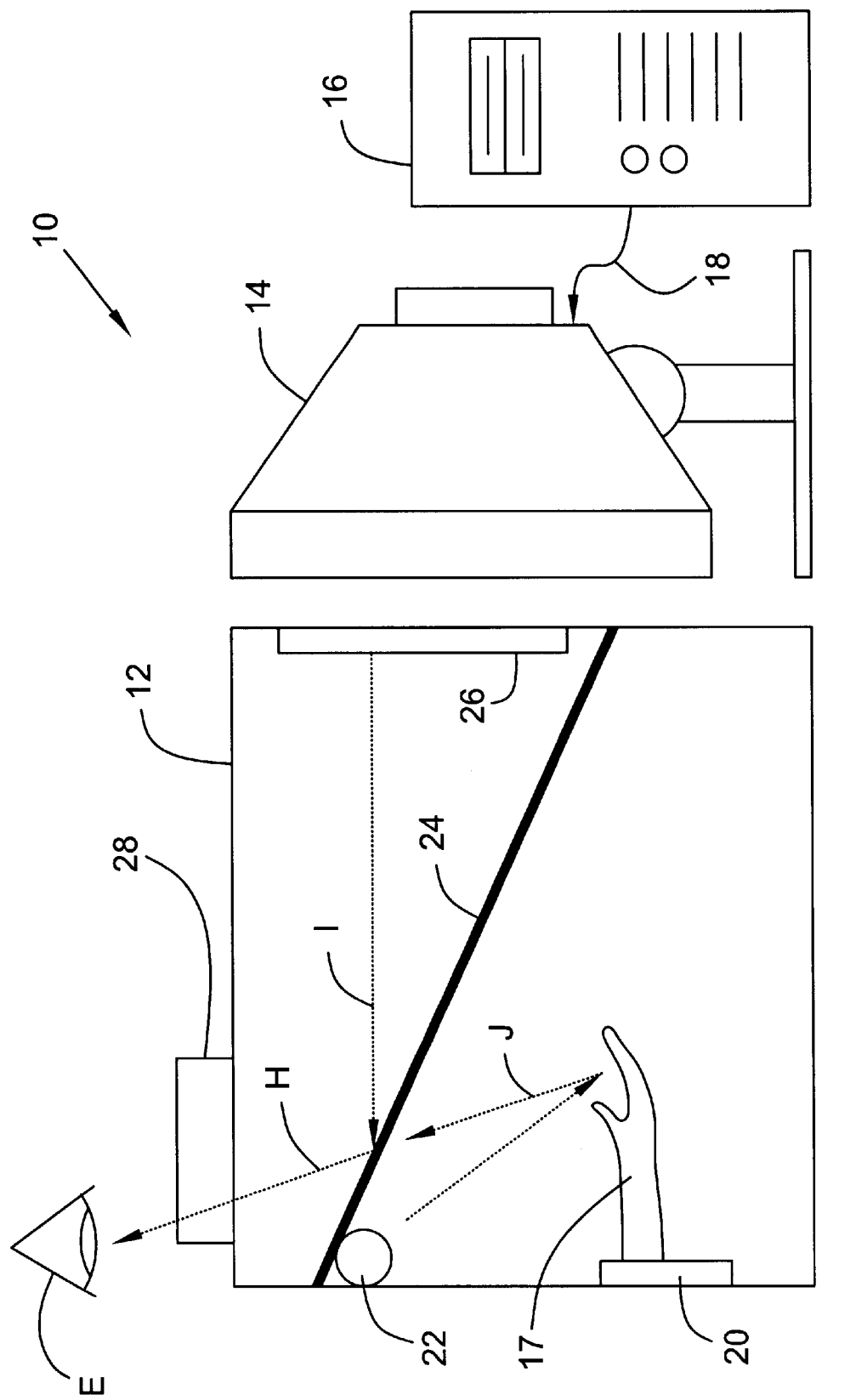
FIG. 1 is a block depiction of one embodiment of the present invention.

Referring to FIG. 1, a processor-based system 10 may include an enclosure 12, a computer display 14, and a computer system 16 in accordance with one embodiment of the present invention. The computer system 16 may be any conventional processor-based computer system including a desktop computer system, a laptop computer system or even a handheld computer system or appliance. The display 14 may be a computer monitor, a liquid crystal display or a television, as examples.

The enclosure 12 may be a rectangular enclosure including at least three openings. An opening 20 enables one or more hands 17 to be inserted into the enclosure 12. Port 26 enables computer generated images displayed on the display 14 to be seen within the enclosure 12. The port 28 enables the user, indicated by the user's eye E, to visualize the interior of the enclosure 12 monoptically or bioptically.

A transreflective or dichroic reflector 24 reflects light from the display 14 for viewing by the user E through the port 28. The reflector 24 also enables the user to directly view the user's hands 17. Thus, the reflector 24 is dichroic in that it both reflects and transmits light. As a result, the resulting image is a composite of the images created by the display 14 and the actual physical object or objects provided beneath the reflector 24, such as the user's hand 17 and any other objects within the enclosure 12. In an alternative embodiment, the display 14 may be viewed directly and the hand 17 may be viewed via reflection from the reflector 24.

A combined light source and digital imaging unit 22 may both illuminate the visual field below the reflector 24 and capture an image of the illuminated visual field. In an alternative embodiment, separate imaging and illuminating units may be used. The light generated by the unit 22 may be reflected from the user's hand 17 and passed through the dichroic reflector 24, as indicated by the arrow J. Similarly, the images generated by the display 14 may be reflected off the reflector 24 for viewing by the user E, as indicated by the arrows I.

Thus, the arrow H indicates a composite image of the actual object or objects such as the hand 17 and the virtual images created by the display 14, represented by the arrow I. The images generated by the computer system 16 may be coupled to the display 14 over a cable 18 such as a serial interface cable.

In some embodiments of the present invention, the ports 26 and 28 include anaglyphic means. Typical anaglyphic means include red/green or red/blue binocular separate devices that create the appearance of three dimensions. The view port 28 may include an anaglyphic lens such that the lens for one user eye is red colored and the lens for the other user eye is blue or green. Thus, the computer generated two dimensional image may appear to have a depth commensurate with the depth of the enclosure 12.

Alternatively, a liquid crystal shutter in the port 28 may be utilized adjacent each of the user's eyes. The computer generated images (I) may be alternated such that each eye sees a slightly different image (in a different time interval) resulting in the illusion of depth. In general, any technique for producing the illusion of three dimensional depth from a two dimensional image may be utilized in accordance with some embodiments of the present invention.

The dichroic reflector 24 may be made of any transreflective material such as Plexiglas or acrylic. The light source included with the unit 22 may be directional and may be shielded from direct observation by the user.

The interior of the enclosure 12 may be covered with a light absorbing or scattering material such as felt. The use of such a material may substantially eliminate any ability to discern features of the interior of the enclosure 12 itself.

Figure 2:
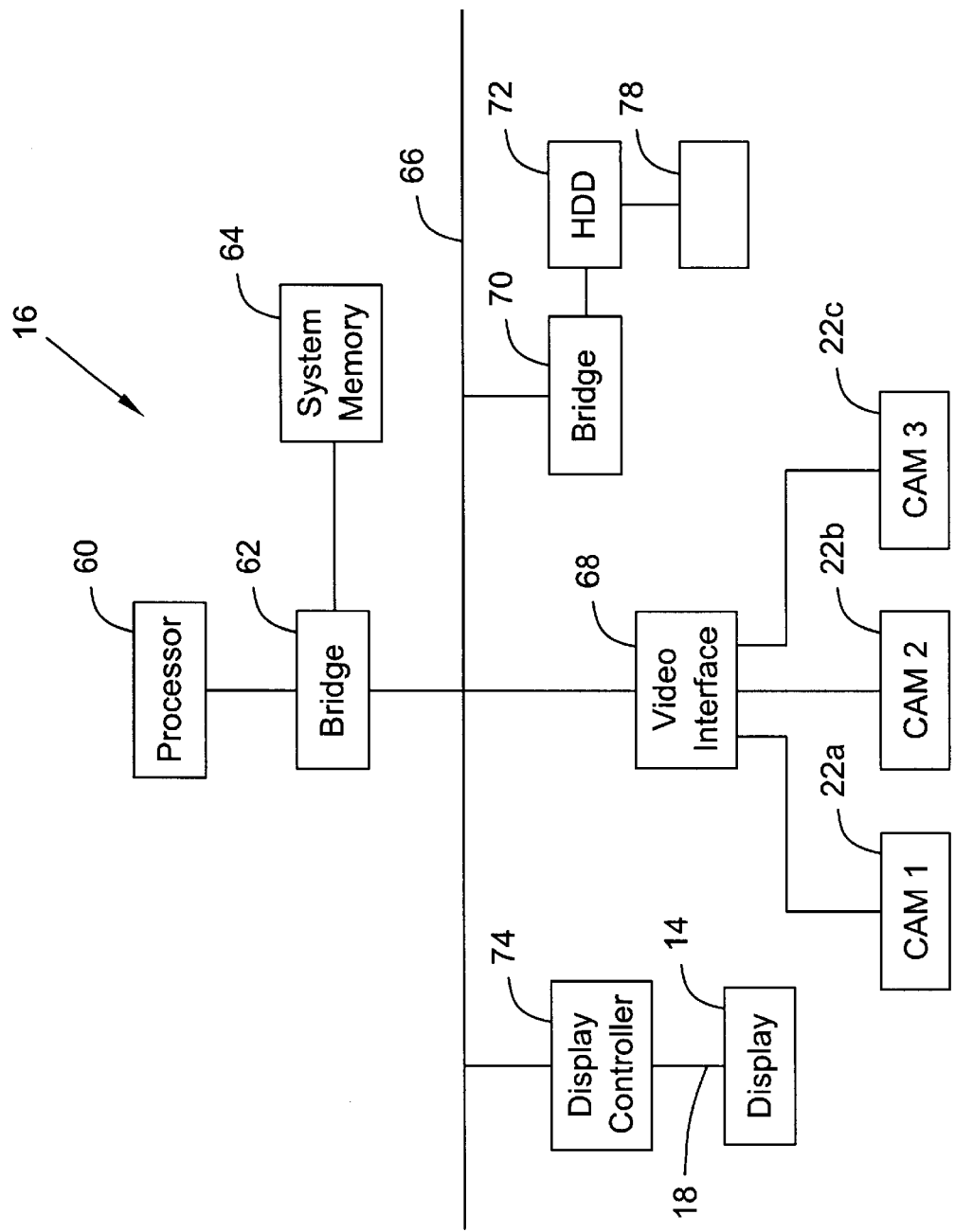
FIG. 2 is a block depiction of the processor-based system shown in FIG. 1.

Referring to FIG. 2, the computer system 16 may include a processor 60 coupled to a bridge 62. The bridge 62 is in turn coupled to the system memory 64 and a bus 66 in accordance with one embodiment of the present invention. The bus 66 may be coupled to a display controller 74 that is coupled to the display 14.

The bus 66 may also be coupled to a video interface 68 that receives video streams from video capture devices such as the cameras 22a, 22b and 22c. Advantageously, the imaging units 22 may be positioned around the interior of the enclosure 12, underneath the reflector 24, to capture a plurality of images of the user's hand 17 or any other objects located therein. In another embodiment, a single camera may capture video from more than one camera angle or a single camera may otherwise provide depth information.

The bus 66 is also coupled to a bridge 70 that is in turn coupled to a hard disk drive 72. The hard disk drive 72 may store software 78 for creating virtual illusions.

In an alternative embodiment, other techniques may be used to resolve the position of the user's hand rather than the use of the cameras 22a–c. For example, ultrasonic transducers may be used like sonar. As another example, data generating gloves may be used.

Figure 3:
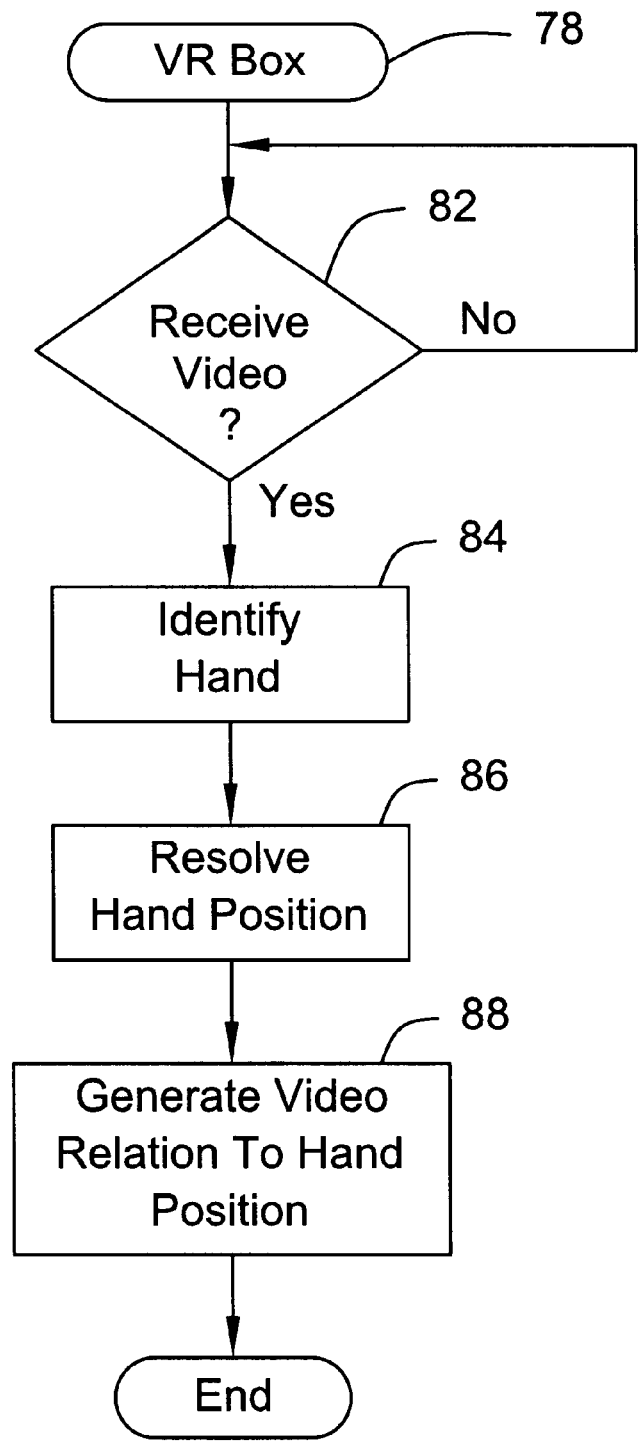
FIG. 3 is a flow chart for software in accordance with one embodiment of the present invention.

Referring next to FIG. 3, the software 78 begins by receiving video from the imaging units 22, as indicated in diamond 82, in accordance with one embodiment of the present invention. The video may include a plurality of frames received as streaming video. The video may be analyzed using pattern recognition techniques, as one example, to identify the user's hand 17, as indicated in block 84. The position of the user's hand in three dimensional space may then be resolved as indicated in block 86. In some embodiments of the present invention, this may be done by comparing the frames generated from each of the imaging units 22a, 22b and 22c in order to resolve, in three dimensions, the position of the hand 17.

Thereafter, image elements may be generated by the computer system 16.relative to the hand 17 position as indicated in block 88. More particularly, the video may be generated and overlaid over the apparent position of the hand 17. As a result, the generated images may appear to move relative to the hand 17, creating the appearance of actual interaction between the virtual or computer generated images and the physical hand 17.

Figure 4A:
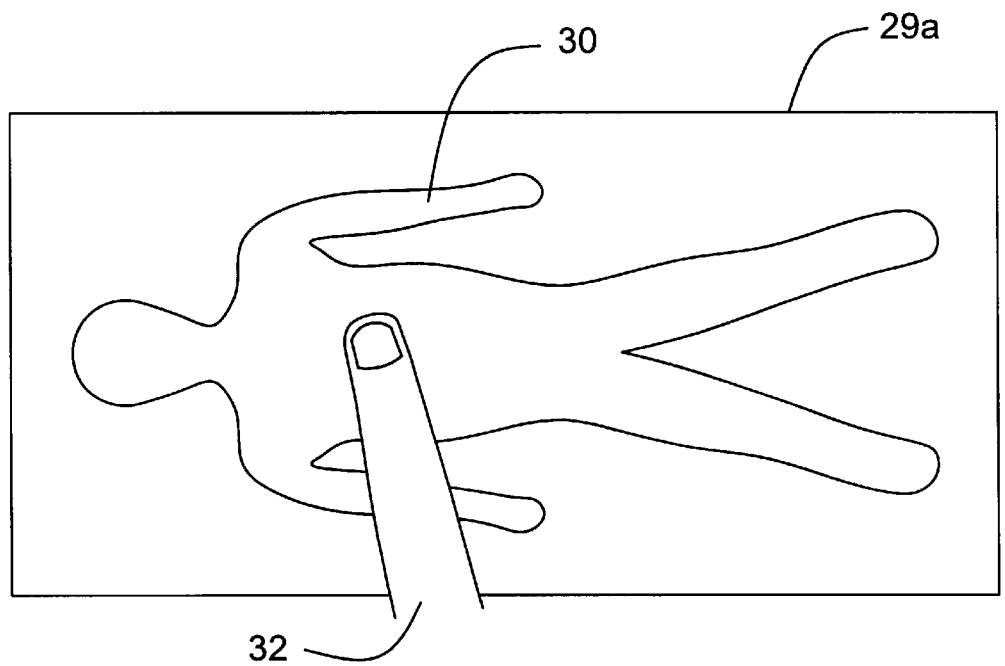
FIG. 4a is an image generated by the system shown in FIG. 1 in accordance with one embodiment of the present invention.
Figure 4B:
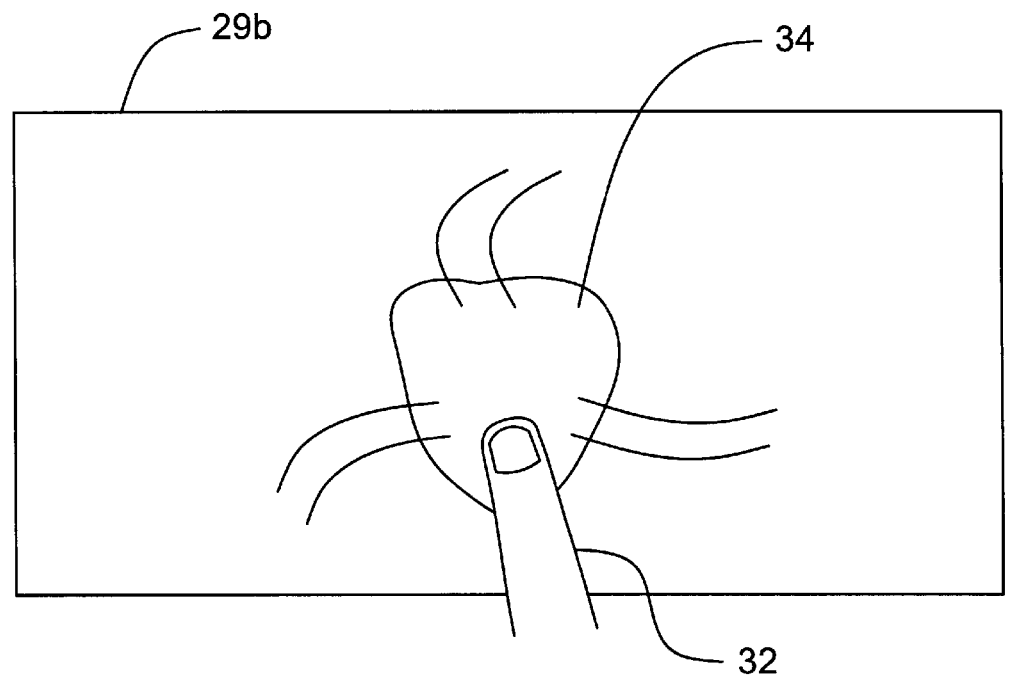
FIG. 4b is an image generated by the system shown in FIG. 1 in accordance with one embodiment of the present invention.

Referring next to FIGS. 4a and 4b, in accordance with one embodiment of the present invention, a scene 29a viewed through the port 28 may include an image of an animate being 30. The being 30 image may be generated by the display 14 and reflected from the reflector 24 for view through the port 28. The user may appear to touch the animate being 30 image as indicated by the user's finger 32. Even though the user's hand 17 is below the reflector 24, the finger 32 may actually appear to overlay the animate being 30. This may be because the depiction of the animate being 30, generated by the computer system 16, may be altered by omission of the portion where the finger 32 is located. As a result, the impression is created that the user's finger, which is actually under the reflector 24, is in fact over the image of the animate being 30.

In response to the user touching the apparent location of the animate being's heart 34, a new display 29b, shown in FIG. 4b, may be created that appears to be the exposed heart of the animate being 30. Thus, the user may attempt to effectively dissect the animate being 30, which in one game play scenario, may be an alien. The user may be treated to depictions of various body parts merely by touching the location associated with a given body part image. The body part image, such as the heart 34, may be generated by the computer system 16. Again, the user's finger 32 may appear in an overlaying arrangement with respect to the heart 34 even though in fact it is physically located under the reflector 24. Similarly, a game scenario may be implemented wherein the user actually dissects an animate model so that the user can "remove" skin or other tissue to view the internal organs of the animate being.

Figure 5A:
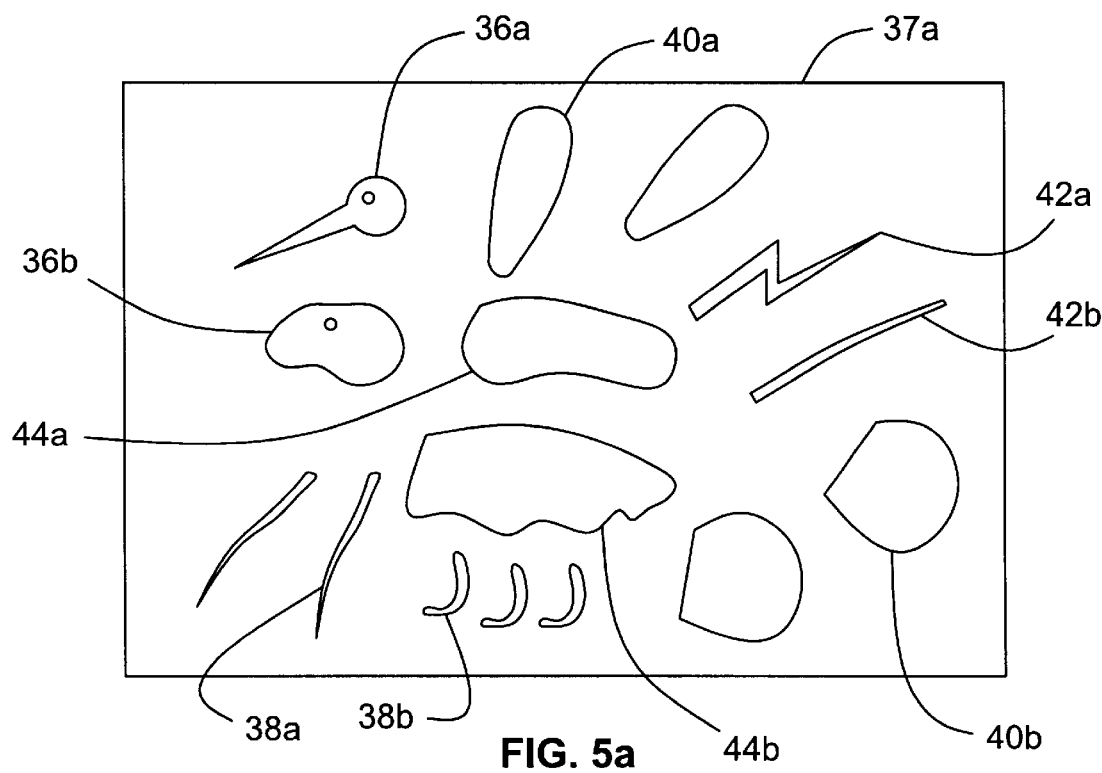
FIG. 5a is an image generated by the system of FIG. 1 in accordance with another embodiment of the present invention.

Turning next to FIG. 5a, in accordance with another embodiment of the present invention, the view through the port 28 is indicated at 37a. In this case, a plurality of insect body part images including heads 36a and 36b, wings 40a and 40b, tails 42a and 42b, bodies 44a and 44b, and legs 38a and 38b appear to be distributed across the interior of the enclosure 12. In fact, all of the images indicated in the scene 37a are computer generated.

Figure 5B:
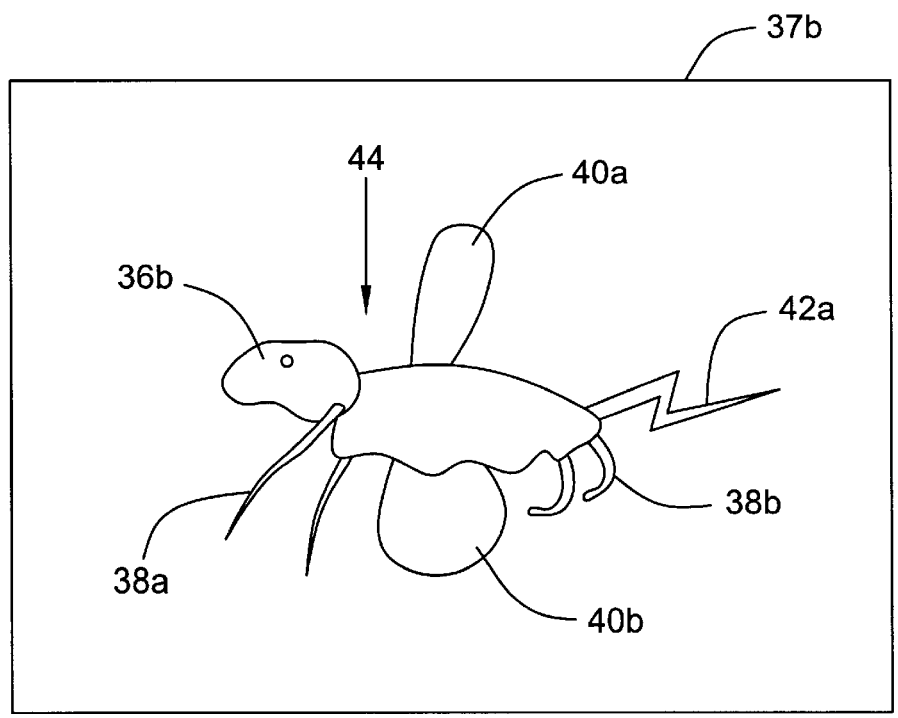
FIG. 5b is another image generated by the system of FIG. 1 in accordance with another embodiment of the present invention.

The user can attempt to grasp the array of images illustrated in FIG. 5a and to build an insect 44 shown in FIG. 5b. In this case, a variety of incongruous body parts may be joined together to create an image. In fact, the user can select any of the body part images and push them together to cause them to be joined. The computer system 16 then realigns the images and permanently positions them, where apparently located, by user hand 17 manipulation. The remaining unused body parts may then be automatically removed from view. Thus, the user can pick up the seemingly light, if not weightless, insect image elements, and physically manipulate them to cause them to join to form an insect image 44. That insect image 44, once completed, may be caused to appear to fly around the interior of the enclosure 12. Of course, in fact all of the images shown in the scenes 37a and 37b may be computer system 16 generated through the display 14.

Figure 6A:
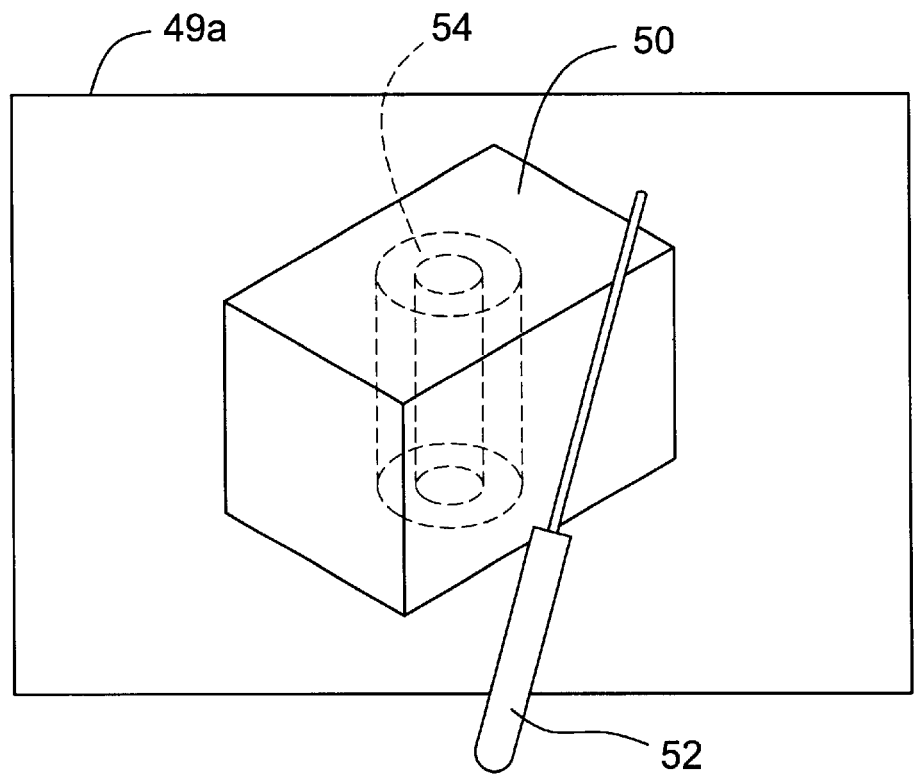
FIG. 6a shows an image generated by the system in accordance with still another embodiment of the present invention.
Figure 6B:
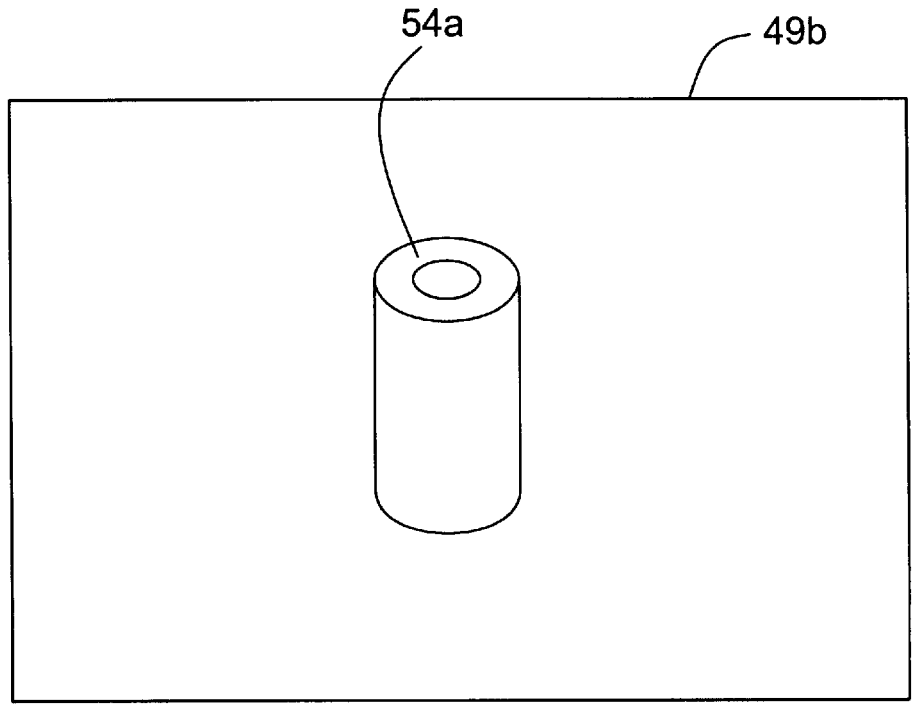
FIG. 6b shows an object created using an embodiment of the present invention.

Turning finally to FIGS. 6a and 6b, a physical block 50 of a carvable material may be positioned beneath the reflector 24. The block 50 then becomes visible through the port 28. The user may use a knife 52 to physically carve the block 50. However, as the user is carving the block 50, an overlay image 54 is generated that appears to be located within the block 50. The location of the block 50 may be determined from the cameras 22a, 22b and 22c.

As a result, the user is able to see an image of the final object that the user wishes to carve from the block 50, apparently located within the block 50. The user can progressively carve the block 50 using the image 54 as a template. Thus, as shown in the scene 49b (FIG. 6b), after the carving is done, a physical object 54a which corresponds to the image 54 may be produced.

The apparent depth of the computer generated images may be adjusted by changing the angle of the sheet 24, the viewing angle or the location of the monitor 14. The computer generated image may be caused to appear to be located over or under the user's hand.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

determining the location of a human controlled object;

overlaying a computer generated image for viewing over said human controlled object by reflecting one of said computer generated image and an image of said object and transmitting the other of said computer generated image and said object image; and controlling said computer generated image so that said computer generated image appears to interact with said human controlled object.

2. The method of claim 1 including providing an enclosure for viewing a human body part and said computer generated image.

3. The method of claim 2 including providing a port in said enclosure that enables viewing of both said human body part and said computer generated image.

4. The method of claim 3 including reflecting one of said human body part or said computer generated image for viewing through said port.

5. The method of claim 1 including providing a transreflective layer that reflects one of said computer generated image and said object and transmits the other of said image and said object for viewing.

6. The method of claim 1 wherein determining the location of the object includes determining the location of said object in three dimensions.

7. The method of claim 6 wherein determining the location of said object in three dimensions includes imaging said object with at least two imaging devices.

8. The method of claim 1 including creating the impression that a user is disassembling an image into one or more parts.

9. The method of claim 1 including enabling the user to manually assemble a plurality of computer generated images into a composite whole.

10. The method of claim 1 including creating an apparent image of an object to be formed.

11. A system comprising:
   an enclosure;
   a first port positioned to enable a user to look into said enclosure;
   a second port arranged to allow the user to insert an object into said enclosure;
   a third port arranged to receive a computer-generated image; and
   a transreflective sheet arranged to enable said computer-generated image and said object to be viewed through said first port in an overlapping arrangement.

12. The system of claim 11 including a processor-based system having a storage and a display device aligned with said third port, said storage storing instructions that enable said processor-based system to determine the location of the object, overlay the computer generated image for viewing over said object and control said computer generated image so that the image appears to interact with the object.

13. The system of claim 12 including a plurality of video cameras for imaging the object in said enclosure.

14. The system of claim 11 including a plurality of lights inside said enclosure underneath said transreflective sheet to illuminate the object.

15. The system of claim 11 including a device to create the appearance of three dimensions from a two dimensional image.

16. The system of claim 15 wherein at least one of said ports includes an anaglyphic device.

17. The system of claim 11 where said sheet transmits an image of the object and reflects the computer-generated image.

18. The system of claim 11 wherein said second port receives the user's hand into said enclosure.

19. An article comprising a medium storing instructions that, if executed, enable a processor-based system to:
   determine the location of a human controlled object in the form of a block of sculptable material;
   overlay a computer generated image for viewing over said human controlled object;
   control said image so that said image appears to interact with said human controlled object;
   create an apparent image of a sculpture to be formed from the object; and
   display said apparent image at a predefined location within said object to enable a user to cut said image from said object.

* * * * *